Feb. 18, 1936.    H. W. HEDBURG    2,031,041
MOTOR VEHICLE AIR CONDITIONER
Filed Aug. 13, 1935    2 Sheets-Sheet 2
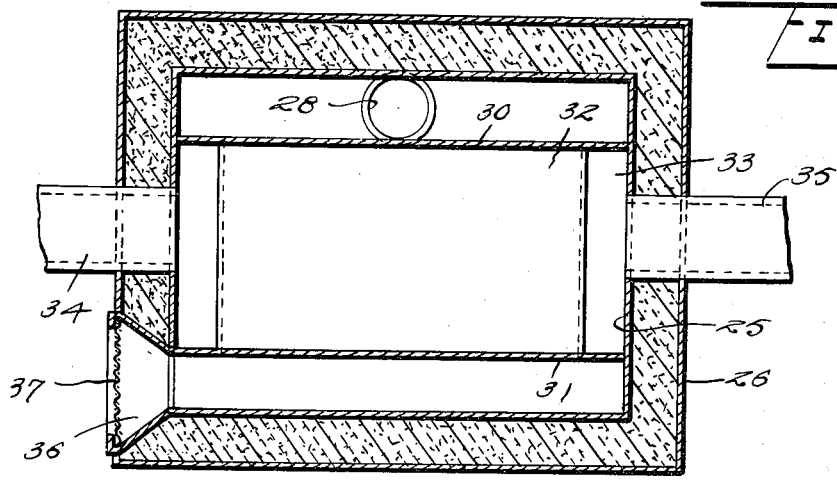
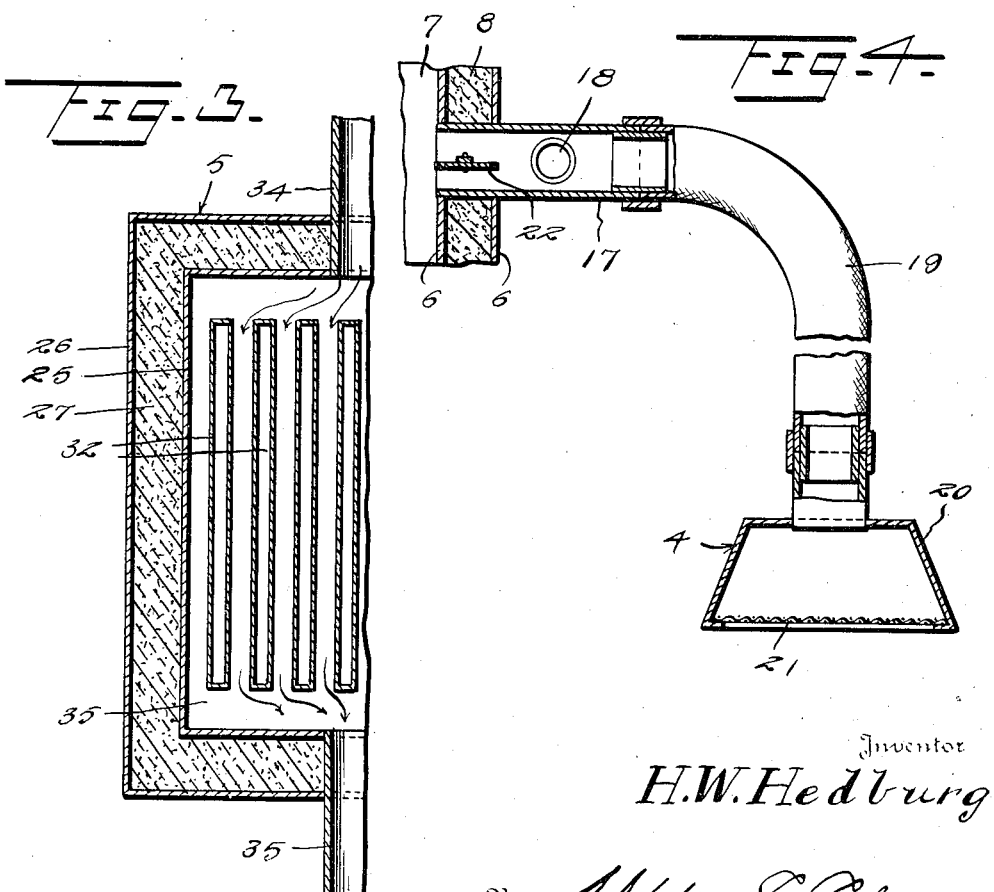
Inventor
H. W. Hedburg
By Watson E. Coleman
Attorney Patented Feb. 18, 1936

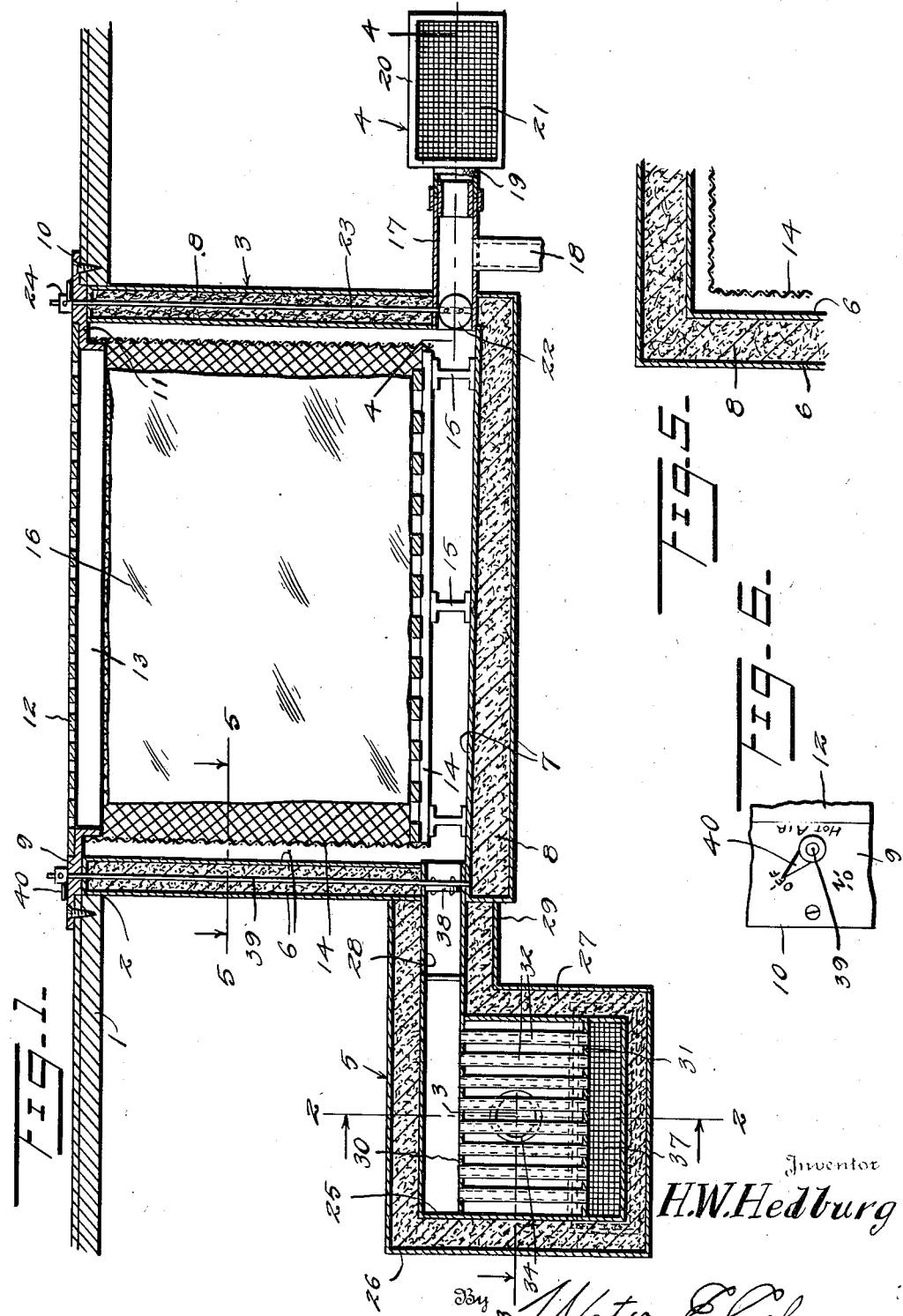

2,031,041

UNITED STATES PATENT OFFICE 2,031,041

MOTOR VEHICLE AIR CONDITIONER

Harry W. Hedburg, Fresno, Calif.

Application August 13, 1935, Serial No. 36,015

6 Claims. (Cl. 257—7)

This invention relates to the class of motor vehicles and pertains particularly to an accessory for the same for treating and modifying the character of the air therein.

The primary object of the present invention is to provide a device whereby the air within a motor vehicle or any other type of vehicle may be cooled or warmed as required so that the interior of the vehicle may be maintained in a comfortable condition regardless of the character of the outside atmosphere.

Another object of the invention is to provide a structure of the above described character wherein the air which is cooled as it enters the machine will be washed so as to remove dust therefrom.

Still a further object of the invention is to provide an air warming or cooling device for a wheeled vehicle in which the cooling mechanism or the heating mechanism may be put into use as desired merely by the turning of a valve.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

Figure 1 is a view in section through a portion of the floorboard of a motor vehicle showing the device embodying the present invention connected with and suspended therefrom and in vertical section;

Figure 2 is a sectional view taken on the line 2—2 of Figure 1;

Figure 3 is a sectional view taken on the line 3—3 of Figure 1;

Figure 4 is a view partly in section and partly in elevation in which the section is taken upon the line 4—4 of Figure 1;

Figure 5 is a sectional view taken on the line 5—5 of Figure 1;

Figure 6 is a view in plan showing one of the controls for a valve.

Referring now more particularly to the drawings, the numeral 1 indicates a portion of the floor structure of a motor vehicle in which an opening 2 is formed through which the device embodying the present invention may be suspended. The present air cooling and heating device comprises the three units indicated generally by the numerals 3, 4 and 5. The unit 3 constitutes the main unit of the device and comprises a receptacle having the spaced inner and outer side walls 6 and the spaced inner and outer bottom walls 7 between which a suitable insulation material 8 is packed. The top of this receptacle is secured in any suitable manner to a frame 9 which has an outer surrounding flange 10 adapted to be secured to the vehicle floor 1 about the edge of the opening 2 so that the receptacle 3 may extend downwardly through the opening for suspension beneath the car floor. An inner flange 11 forms an integral part of the frame 9 and has its top set below the top of the frame 9 so as to form a recess for the reception of the edge of the grating 12 whereby the surface of the grating and of the frame will be flush. The flange 11 has at its inner edge the downwardly extending lip portion 13 to which is attached the heavy screen wire body 14 which forms a cage within the receptacle in spaced relation with the inner wall thereof and which is attached at its bottom to the edge of a rack 14 which is supported in spaced relation with the bottom inner wall 7 of the receptacle by suitable posts such as are indicated by the numeral 15. There is thus formed an inner perforate walled receptacle within the outer double walled receptacle, in which a body of ice 16 or any other suitable cooling body may be placed through the opening covered by the grating 12.

As shown in Figure 1, the inner bottom wall 7 of the main receptacle 3 is inclined toward one side of the receptacle and toward an outlet pipe 17 through which the drippings from the ice body 16 are carried off to the drain-off pipe 18. The outer end of the pipe 17 is coupled with a suitable pipe 19 which may be of a flexible character, which leads to and is connected with a wall of an air collecting funnel 20 which is provided with an open screened front 21. This air collecting funnel may be placed in any suitable location upon the motor vehicle and it is preferred that it be directed toward the front of the vehicle so that as the latter moves forward air will be forced into the funnel and through the pipes 19 and 17 to enter the unit 3 through which it will flow about the ice body 16 and escape through the grating 12 into the interior of the car. The pipe 17, therefore, in addition to providing an exit or outlet for the drippings from the body 16 also provides an inlet for fresh air and as the air enters, it will flow over the water which is draining out of the unit 3 and around the ice or other cooling body 16 and thus be washed at the same time that it is cooled.

Within the inner end of the pipe 17 is a rotary or butterfly valve 22 which is controlled by a stem 23 which passes upwardly, preferably between the walls 6 of the unit 3, to the upper side of the frame 9 where it has secured to it an indicator finger 24 by which it and the valve may be rotated to open or close the pipe 17. Suitable notations are made upon the frame 9 to indicate when the valve is open and when it is closed.

The unit 5 comprises a means of heating air which is taken from the outside and then conducted into the interior of the unit 3 where it passes into the interior of the car. This unit, naturally, is only made use of in cool or cold weather, at which time the interior of the unit 3 is empty but may be employed, if desired, as a container for such articles as it may be necessary or desirable to keep warm, in which case the heated air passing through will impart some of its heat to the articles in the receptacle and discharge the remainder into the interior of the motor vehicle. The unit 5 comprises a two-walled housing having the inner and outer walls 25 and 26 in spaced relation and separated by a body of insulation 27, the top wall having joined therewith and leading therethrough one end of a pipe 28 which extends through the two walls 6 of the unit 3 to the interior of the latter. The outer wall 26 of the unit 5 is extended at one side of the unit around the pipe 28, as indicated at 29 so that the pipe 28 will be insulated throughout.

Within the inner portion or shell of the unit 5, are two horizontally disposed parallel spaced upper and lower partitions 30 and 31, respectively, which are joined by the broad flat tubes 32 which open at their upper and lower ends through these partitions. The vertical ends of the flat tubes 32 are spaced from the adjacent sides of the inner wall 25 of the unit leaving the areas 33 and extending through the opposite sides of the unit 5 and opening into the areas 33 are the pipes 34 and 35, one of which is connected with the exhaust manifold of the engine of the motor vehicle in which the device is used while the other leads to and is connnected with the muffler of the vehicle.

Along one side of the unit 5, an air inlet opening 36 is formed which is covered by a screen 37 at its outer side. This opening leads into the interior of the unit beneath the partition 31 so that air entering through this opening will flow upwardly from beneath the partition 31 through the tubes 32 to the area above the partition 30 and pass outwardly through the pipe 28 to the interior of the unit 3. The screened opening 36 is preferably disposed so that it will not be directed toward the front of the motor vehicle and in the structure illustrated, it is prefererd that the pipe 35 be coupled with the motor vehicle exhaust manifold and the pipe 34 with the muffler so that the air opening will be directed toward the rear of the vehicle. Although the air inlet 36 is preferably directed away from the front of the vehicle, this will not prevent the desired circulation of heated air from the tubes 32 into and through the casing which opens through the grating 12 into the vehicle, because of the convection currents which will be set up by the heating of the air into the tubes 32. As this heated air naturally tends to rise it will enter the tube 28 and draw in additional fresh air through the screened inlet 36. In the pipe 28 is located a butterfly valve 38 by which the passage of air is controlled and this valve is controlled by the stem 39 which leads upwardly, preferably between the walls 6 of the unit 3, to the top of the frame 9 where it has attached thereto the pointer 40 which indicates on or off designations upon the top surface of the frame 9, as illustrated in Figure 6. This illustrates the same construction used in connection with the pointer 24 which is coupled with the cool air control valve except that the frame adjacent the pointer 40 is marked "Hot air" while adjacent the pointer 24 it would be marked "Cold air".

From the foregoing, it will be apparent that a motor vehicle equipped with the structure herein described may be kept in a comfortable condition at all times. During hot weather the valve 15 will be kept open, and with a cooling or refrigerating body of any suitable character in the unit 3, the air picked up by the funnel 20 will be caused to pass through the unit 3 over the refrigerating body and will be effectively cooled before it enters the vehicle. In cold weather, the valve 38 will be open so that the air entering through the inlet opening 36 will pass through the tubes 32 and be heated before it passes into the unit 3. The exhaust the vehicle through the unit 3. The exhaust gases from the engine manifold merely flow between the tubes 32 and cannot get mixed with the air entering the motor vehicle, therefore, there is no danger to the health of the occupants of the vehicle.

What is claimed is:—

1. A motor vehicle air conditioning structure, comprising a receptacle having spaced inner and outer walls, insulation material between said walls, said receptacle having an open top, a frame secured over and about the edges of said walls at said open top facilitating the suspension of the receptacle in a floor opening, a grating supported upon the frame and closing the top of the receptacle, a second inner receptacle having a wall of foraminous material attached to said frame and suspended in the first receptacle in spaced relation with the inner wall of the same, a bottom for said second receptacle for the support therein of a refrigerant material, an air collecting unit, and an air conducting pipe leading from said unit through the wall of the first receptacle and discharging thereinto beneath the bottom of the second receptacle.

2. A motor vehicle air conditioning structure, comprising a receptacle having spaced inner and outer walls, insulation material between said walls, said receptacle having an open top, a frame secured about the edge of said open top facilitating the suspension of the receptacle in a floor opening, a grating supported upon the frame and closing said top, a second inner receptacle having a wall of foraminous material attached to said frame and suspended in the first receptacle in spaced relation with the inner wall of the same, a bottom for said second receptacle, an air collecting unit and an air conducting pipe leading from said unit through the wall of the first receptacle and discharging thereinto beneath the bottom of the second receptacle, valve means controlling the flow of air through said air passageway, a second air collecting means, a pipe line leading therefrom to the interior of the first receptacle, valve means controlling said last pipe line, and means for heating air collected by and passing through the said second air collecting means.

3. A motor vehicle air conditioning structure, comprising a receptacle having spaced inner and outer side and bottom walls and an open top, insulation material between said walls, a frame surrounding said open top and designed to facilitate the securing of the receptacle in a floor opening, said frame having an inwardly extending flange terminating in a downturned lip, a grating removably disposed upon said flange and closing the open top of the receptacle, an inner receptacle having a foraminous wall attached to and suspended from said lip in spaced relation with the inner wall of the first receptacle, a bottom for said inner receptacle secured to the foraminous wall thereof and spaced from the inner wall of the bottom of the first receptacle, means for conducting air into the first receptacle beneath the said bottom of the inner receptacle, drainage means for said first receptacle, and valve means controlling the passage of air into the first receptacle and controllable from the top of said frame.

4. A motor vehicle air conditioning structure, comprising a receptacle having spaced inner and outer side and bottom walls and an open top, insulation material between said walls, a frame surrounding said open top and designed to facilitate the securing of the receptacle in a floor opening, said frame having an inwardly extending flange terminating in a downturned lip, a grating removably disposed upon said flange and closing the open top of the receptacle, an inner receptacle having a foraminous wall attached to and suspended from said lip in spaced relation with the inner wall of the first receptacle, a bottom for said inner receptacle secured to the foraminous wall thereof and spaced from the inner wall of the bottom of the first receptacle, means for conducting air into the first receptacle beneath the said bottom of the inner receptacle, drainage means for said first receptacle, valve means controlling the passage of air into the first receptacle and controllable from the top of said frame, a heating unit comprising inner and outer spaced walls, insulation between said last walls, a pipe leading from the interior of the heating unit through the wall of said first receptacle, valve means in said last pipe, partitions within the heating unit dividing the same into upper and lower chambers and a central chamber, air tubes connecting said partitions and the upper and lower chambers, means for conducting air into the lower chamber for passage through said air tubes, and means for passing heated motor exhaust gases through the central chamber about said air tubes.

5. An air conditioning structure, comprising a receptacle having an open top, a plate bordering said open top and having inwardly and outwardly extending flanges, the outwardly extending flange being adapted to engage a floor surface when the receptacle is disposed in an opening therein, said inwardly extending flange having its top at a lower elevation than the top of the plate to form an inset shoulder and terminating in a downwardly extending lip, an apertured plate covering the open top of the receptacle, a refrigerant supporting floor disposed in the lower part of the receptacle in spaced relation with the bottom of the same, and a foraminous wall defining an enclosed area over said floor and connecting the floor with said lip.

6. An air conditioning device for a motor vehicle having an exhaust, comprising a receptacle having an open top, a grating removably covering said open top, a supporting flange surrounding the top of the receptacle for engaging the top surface of the vehicle floor when the receptacle is disposed in an opening therein, a second receptacle within the first receptacle having a bottom in spaced relation with the bottom of the first receptacle and having a foraminous side wall, said second receptacle being adapted to receive a refrigerant body, a valve controlled air inlet at the lower part of the first receptacle, a housing having vertically spaced partitions dividing the interior into upper intermediate and lower chambers, heat conducting tubes connecting the partitions through the intermediate chamber, said upper chamber being connected with the air inlet for the receptacle, air inlet means for the said lower chamber, means for connecting said intermediate chamber with said engine exhaust, and an outlet for the intermediate chamber for the discharge therefrom of products of combustion from said exhaust.

HARRY W. HEDBURG.